United States Patent [19]
Atac et al.

[11] Patent Number: 4,985,830
[45] Date of Patent: Jan. 15, 1991

[54] INTERPROCESSOR BUS SWITCHING SYSTEM FOR SIMULTANEOUS COMMUNICATION IN PLURAL BUS PARALLEL PROCESSING SYSTEM

[75] Inventors: Robert Atac, Aurora; Mark S. Fischler, Warrenville; Donald E. Husby, DeKalb, all of Ill.

[73] Assignee: Universities Research Association, Inc., Washington, D.C.

[21] Appl. No.: 249,694

[22] Filed: Sep. 27, 1988

[51] Int. Cl.[5] .................... G06F 13/364; G06F 13/14; G06F 13/42; G06F 15/16
[52] U.S. Cl. ............................... 364/200; 364/222.2; 364/222.3; 364/229.2; 364/240.7; 364/238; 364/259.2; 364/260; 364/284; 370/67
[58] Field of Search .................. 364/200, 900; 370/67, 370/85

[56] References Cited
U.S. PATENT DOCUMENTS 4,435,755  3/1984  Meritt ................................. 364/200
4,811,210  3/1989  McAulay .......................... 364/200
4,845,722  7/1989  Kent et al. ......................... 370/58

Primary Examiner—Archie E. Williams, Jr.
Assistant Examiner—Ayni Mohamed
Attorney, Agent, or Firm—Neuman, Williams, Anderson & Olson

[57] ABSTRACT

A bus switching apparatus and method for multiple processor computer systems comprises a plurality of bus switches interconnected by branch buses. Each processor or other module of the system is connected to a spigot of a bus switch. Each bus switch also serves as part of a backplane of a modular crate hardware package. A processor initiates communication with another processor by identifying that other processor. The bus switch to which the initiating processor is connected identifies and secures, if possible, a path to that other processor, either directly or via one or more other bus switches which operate similarly. If a particular desired path through a given bus switch is not available to be used, an alternate path is considered, identified and secured.

2 Claims, 9 Drawing Sheets

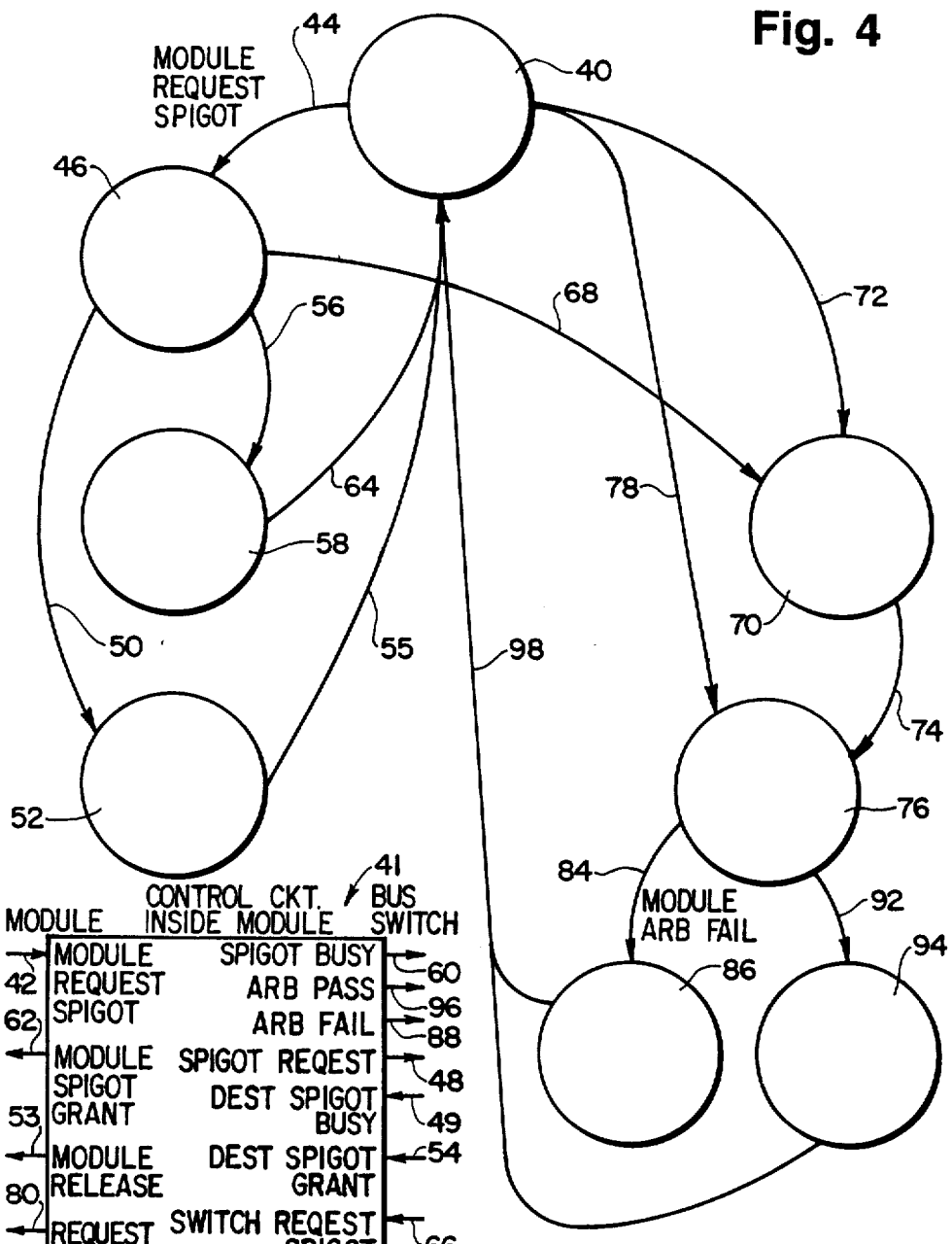

INTERPROCESSOR BUS SWITCHING SYSTEM FOR SIMULTANEOUS COMMUNICATION IN PLURAL BUS PARALLEL PROCESSING SYSTEM

This invention was made with Government support under Contract No. DE-AC02-76CH03000 awarded by the U.S. Department of Energy. The Government has certain rights in the invention.

BACKGROUND OF THE INVENTION

The present invention relates generally to computers. More particularly, the present invention relates to communication bus architecture in multiple processor computer systems. Specifically, the present invention provides a method and apparatus for establishing many simultaneous communication links, each link being between any two processors of an array of multiple processors.

Computer systems that use parallel processing to achieve high overall system speed often need high-throughput communication media. Typical bus structures allow a maximum transfer rate of on the order of 50 megabytes per second. This is adequate for those computing problems that require a much greater amount of computing time as compared to communication time. However, a significant portion of those computing problems that lend themselves to solution by parallel processing have large communication requirements as well as large processing requirements. In solving these problems, it is the throughput limitations of the communication media that most profoundly limit overall system speed.

In order to increase communication throughput, bus switches have been designed that can accommodate many independent simultaneous communications. An example of such a switch is the SN74AS8840 Digital Crossbar Switch which is available from Texas Instruments, Inc. The SN74AS8840 is a device having 16 four-bit data I/O ports. The devices can be combined to form 16 data I/O ports having a word length of any number of bits. For example, eight SN74AS8840 devices can be combined to form 16 data I/O ports, each having a 32 bit word.

In a multiple processor application, 16 processors can be coupled to a bus switch made of SN74AS8840 devices. As such, as many as eight separate communications can be carried on simultaneously. Any two processors can be communicating while as many as seven other such pairs of processors similarly simultaneously communicate. In a sense, this type of bus switch is similar to a telephone exchange, where any person can talk to any other person at the same time as other sets of two people are talking.

While increasing communication throughput in a multiple processor system, bus switches such as the SN74AS8840 have the limitation of being able to switch between only a small number of processors or other terminal devices. For example, the SN74AS8840 can accommodate only 16 processors or other elements. This limitation effectively limits the total available processing power.

OBJECTS OF THE INVENTION

Accordingly, it is an object of the present invention to provide a method and means of bus switching that generally overcomes the deficiencies of the prior art.

It is a more specific object of the present invention to provide a method and means of bus switching that facilitates an overall system size that can be tailored to the needs of any application.

It is a further object of the present invention to provide a method and means of bus switching that can accommodate a system having an unlimited number of processors.

A related object of the present invention is to provide a method and means of bus switching whereby any processor in a system having any number of processors can communicate with another such processor while other such communications can simultaneously occur.

It is yet another object of the present invention to provide a means of bus switching that can be incorporated as the backplane of a standardized modular crate hardware package so as to achieve packaging compactness and to avoid signal delay.

A further object of the present invention is to provide a means and method of bus switching whereby individual processors of a multiple processor system are standard and interchangeable.

Another object of the present invention is to provide a bus switch architecture fundamentally comprised of standard bus switch elements.

SUMMARY OF THE INVENTION

The above and other objects are accomplished by a means and method of bus switching wherein a plurality of bus switches are interconnected by branch buses and each processor of the system is connected to a spigot of a bus switch. Each bus switch further physically serves as a backplane of a modular crate hardware package, to which processor modules or other modules can be directly connected. A first processor requests a communication path to a second processor which is identified by its unique branch bus address. The bus switch to which the first processor is connected receives the request via its source spigot and identifies a primary destination spigot that if communicatably linked to the source spigot could form part of the communication path. Circuitry of that bus switch determines whether the primary destination spigot is available to be used, and if so, a link is effected between the source and primary destination spigots, thereby completing a link through that bus switch.

If the primary destination spigot is busy and unavailable, an indication of whether an alternate destination spigot exists is checked. If one exists, the bus switch determines whether it is available, and if so, a link is effected between the source and alternate destination spigots, thereby completing a link through that bus switch.

If the selected destination spigot is connected to the second processor, then the requested path is complete, and communication along it can begin. If not, the selected destination spigot may be connected to a branch bus through which the request and bus address will be communicated to a second bus switch. At the second and all subsequent bus switches the same process occurs as described above until the second processor is reached, and a communication path is effected.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 4 is a state diagram of the arbitration process carried out by a control circuit of a module connected to a bus switch of the present invention;

FIG. 5 is a block diagram showing the arbitration control signals received and generated by a control circuit of a module connected to a bus switch of the present invention;

DETAILED DESCRIPTION OF THE PREFERRED EMBODIMENT

Figure 1:
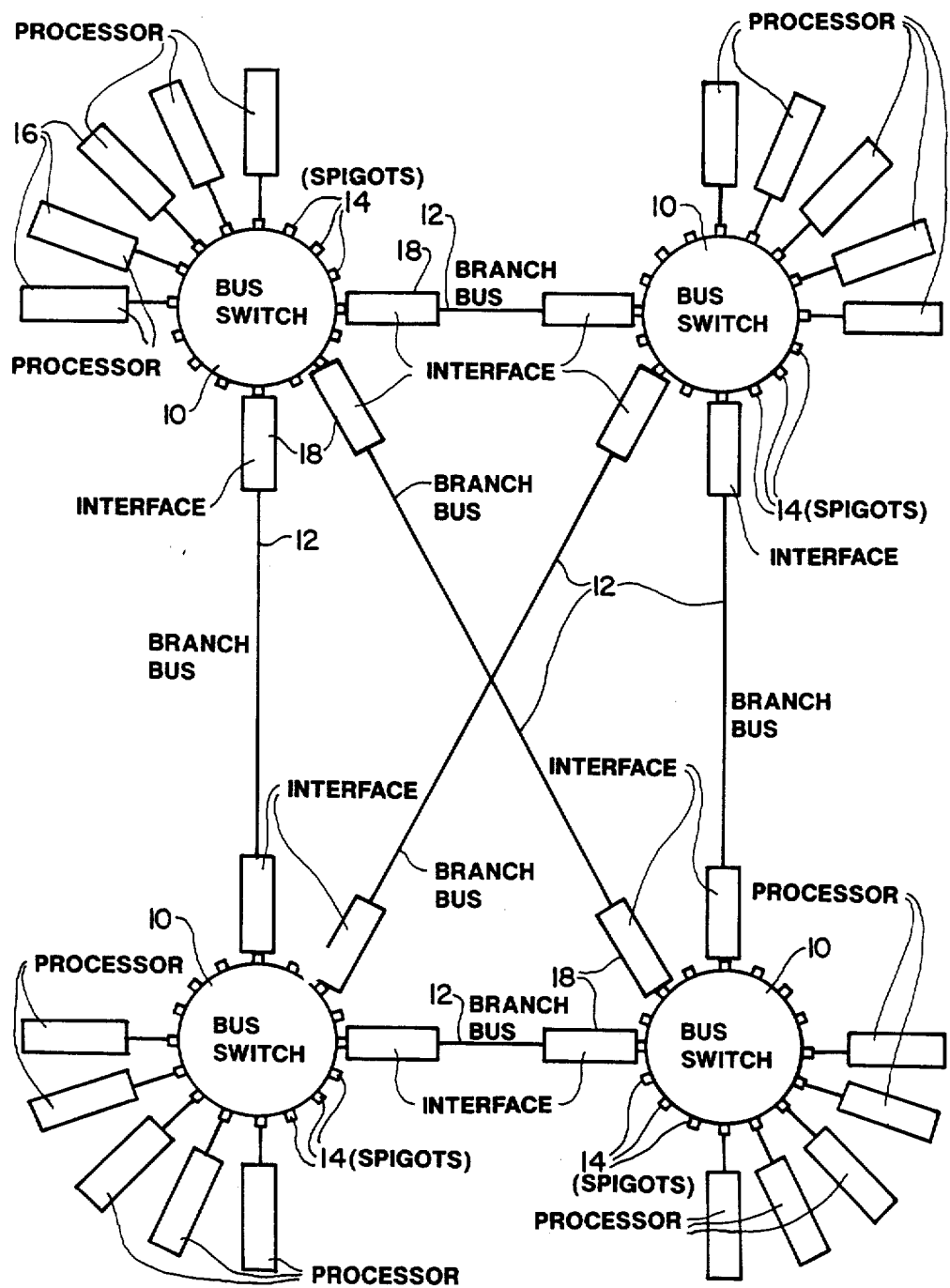
FIG. 1 is a block diagram illustrating the bus architecture of a computer system incorporating the present invention.

Referring now to the drawings, FIG. 1 illustrates the bus architecture of a system according to the present invention. In the illustrated embodiment, four bus switches 10 are interconnected by branch buses 12. Each bus switch 10 has 16 spigots 14 to which can be connected individual processors 16 or branch buses 12, for example. Each bus switch 10 can be incorporated into the backplane of a standardized modular crate hardware package so that each spigot connection will be between the backplane of a crate and a printed circuit card housed in that crate. In this way, packaging compactness is achieved and potential signal delay is avoided which could otherwise be caused by cables used at spigot connections. When a spigot 14 is connected to a branch bus 12, it is done via a branch bus interface 18. With the bus architecture of the present invention, bus switching can occur to couple any two processors 16 via at least two alternate routes. Although not all processors are illustrated in FIG. 1, the system shown therein can support 52 processors, 13 being attached to each bus switch 10. In addition, it should be understood that the system of FIG. 1 is illustrative of the building block approach used with the bus switching method of the present invention. Additional bus switches can easily be added, with additional interconnecting branch buses, to create a system capable of accommodating more processors and having even greater processing power.

Figure 2:
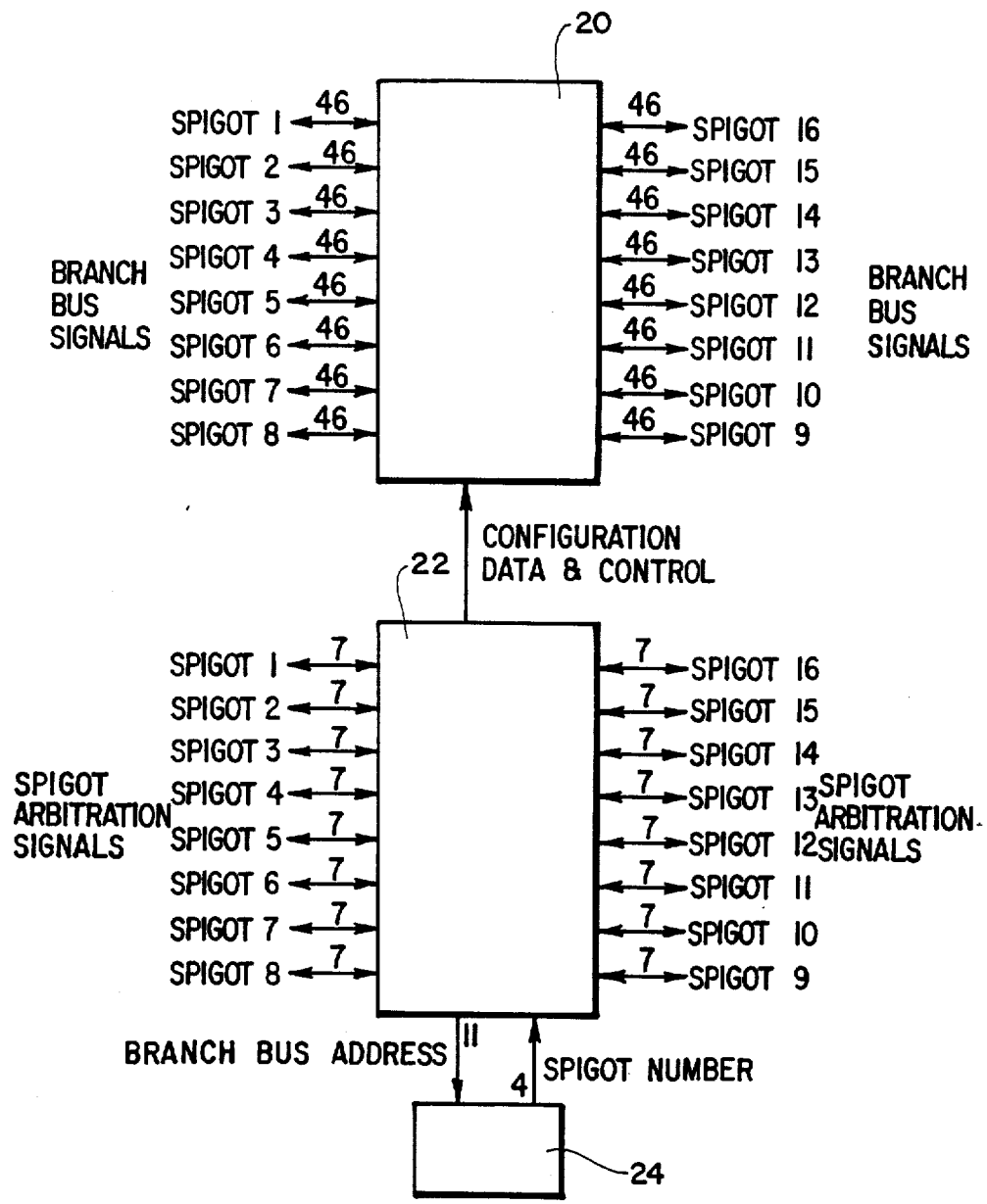
FIG. 2 is a simplified block diagram illustrating the internal structure of a bus switch of the present invention.

The bus switching means of the present invention can incorporate a number of interconnected individual bus switches 10. Each bus switch 10 can effect eight simultaneous links between any eight pairs of spigots 14 of the bus switch 10. FIG. 2 illustrates by way of overview a block diagram of the internal structure of each bus switch 10. Crossbar switch 20 comprises 13 SN74AS8840 Digital Crossbar Switches connected in parallel to accommodate buses having a width of 46 bits. Bus signals are transferred from one spigot to another through the crossbar switch 20. The actual routing of bus signals from one spigot to another is determined by the configuration of the devices. Each of the 13 devices should be configured identically and simultaneously. Configuration is accomplished via a configuration port on each device and is controlled by arbiter 22. The arbiter 22 of each bus switch 10 receives and generates control signals that are used to accomplish spigot routing control.

A routing ROM 24 is associated with each bus switch 10. Each processor 16 in the overall system, without regard to the bus switch 10 to which it is directly connected, has a unique branch bus address. Encoded in the routing ROM 24 is the spigot number of the bus switch which is to be used to ultimately reach a chosen processor. In operation, a module connected to a source spigot of a given bus switch 10 provides a desired destination branch bus address. The source spigot is the conduit through which bus signals, including the desired destination branch bus address, enter the bus switch 10. The desired destination branch bus address identifies the individual processor with which communication is desired. The source spigot may receive bus signals from a processor 16 connected directly thereto or may receive bus signals from a branch bus 12 whose source was another bus switch. The routing ROM 24 reduces an 11-bit destination branch bus address to a four bit spigot number. The routing ROM 24, therefore, may be described as being programmed with branch bus address to spigot number mapping. Whether the chosen destination processor is directly connected to a given bus switch 10 or needs to be accessed via a branch bus 12 to another bus switch, the routing ROM 24 identifies a spigot sufficient to reach that destination processor. Through the function of the routing ROM 24, a system incorporating the present invention can use processor modules or other modules that are standard and interchangeable. That is, each processor, or other module connected to a spigot, need only be designed to communicate through a spigot; it need not be designed to communicate with other specific, identified processors.

When a processor module 16 of the system attempts to communicate with another processor module, the arbiter 22 of the bus switch 10 to which it is directly connected "arbitrates" for a communication path. The communication path through a bus switch 10 will be from a source spigot to a destination spigot, whether or not the source spigot is connected directly to the requesting processor or the destination spigot is connected directly to the intended destination processor.

Figure 3:
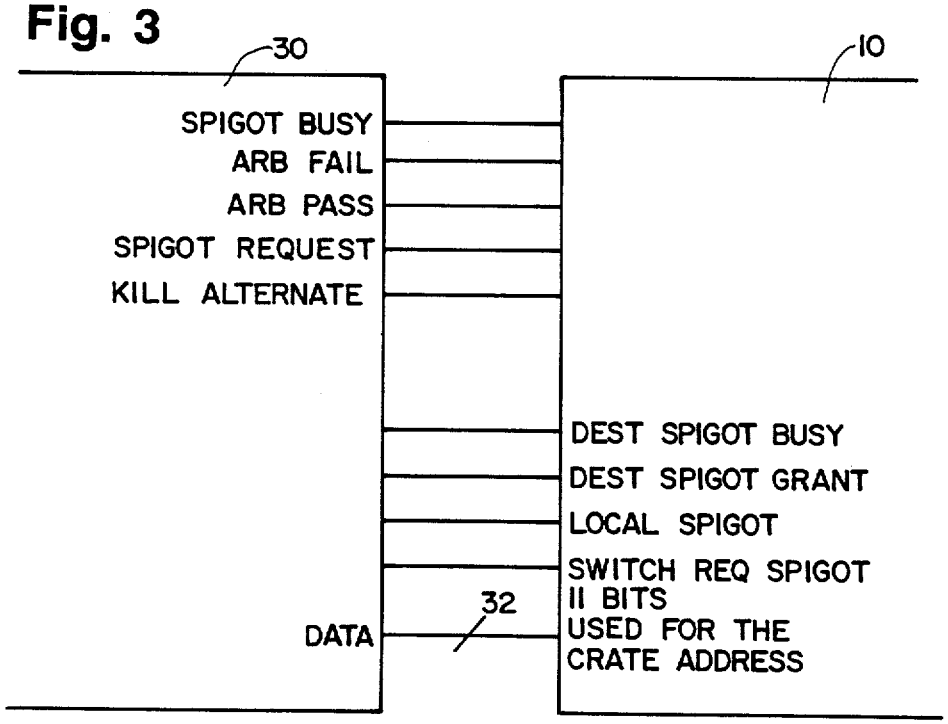
FIG. 3 is a block diagram showing the arbitration control signals passing between a bus switch of the present invention and a compatible module connected thereto.

If a communication path encompasses other bus switches 10, the arbiters 22 of those bus switches must also arbitrate for a connection. The arbitration process is how the system establishes communication via an available path. When a processor module 16 requests a communication path, the bus switch spigot to which it is connected is a source spigot, and the arbiter 23 of that bus switch must try to find an available path to an acceptable destination spigot. Once a destination spigot has been arbitrated for and secured, status information is sent to the source spigot, and the bus transaction can then take place. FIG. 3 illustrates the arbitration signals passing between a module 30 (either a processor module 16 or a branch bus interface module 18) and a bus switch 10. Those signals are defined as follows.

SPIGOT BUSY is a high true signal that is used to indicate that the spigot is busy, or that no module is plugged into that slot. It is driven by any module that is connected to a spigot. If that module is currently communicating with another module, it raises SPIGOT BUSY.

ARB PASS is a low true status signal from the module to the bus switch indicating that the spigot is available. This signal is returned at the end of the spigot arbitration cycle. The destination spigot holds the ARB PASS signal asserted for the entire duration of the communication.

ARB FAIL is a low true status from the module to the bus switch indicating that the spigot is not available. This may be returned even though SPIGOT BUSY was not asserted before the arbitration cycle started. If a branch bus interface module is being used, it will arbitrate for its branch bus during the spigot arbitration process. If the branch bus is busy, ARB FAIL status is returned.

SPIGOT REQUEST is a low true signal that indicates, to the bus switch, that this spigot is requesting a connection through the bus switch. This signal is the start of the arbitration cycle. The final destination crate address must be stable on the data lines before this signal is asserted.

KILL ALT is a high true input that instructs the bus switch to disable an alternate path function, described hereinafter. When this signal is deasserted and a primary path is busy, the bus switch will try an alternate path defined by the routing ROM.

DEST SPIGOT BUSY is a high true status signal returned by the bus switch. It indicates, to the module, that the switch tried to arbitrate for an acceptable destination spigot and failed. SPIGOT REQUEST should be deasserted as soon as this signal is received.

DEST SPIGOT GRANT is a high true status signal returned by the bus switch. It indicates, to the module, that the switch has secured an acceptable destination spigot and has opened a connection between the two spigots. SPIGOT REQUEST should be deasserted as soon as this signal is received.

LOCAL SPIGOT is a high true status signal returned by the bus switch when the crate being addressed is on the source spigot. This situation occurs when the source spigot is connected to a branch bus, and on that branch bus is the intended destination crate. The switch will see the request and check its routing ROM to see what destination spigot has that crate address. Because the destination crate is on the source spigot, the bus switch need not get involved, so LOCAL SPIGOT is returned.

SWITCH REQUEST SPIGOT is a low true signal driven by the bus switch. It indicates, to the destination module, that the switch wants use of that spigot. After this signal has been asserted, the spigot must run through its arbitration sequence, as described below, and then return either ARB PASS or ARB FAIL. SWITCH REQUEST SPIGOT will be deasserted as soon as SPIGOT REQUEST is deasserted by the source spigot.

FIG. 4 is a flow chart of the arbitration process that would be carried out by a control circuit inside any generic module connected to a bus switch spigot. FIG. 5 identifies the signal labels used in FIG. 4 and illustrates the direction of those signals with respect to the module hardware or the bus switch hardware. Prior to the execution of an arbitration cycle, the arbitration control circuit 41 of a given module is in initial state 40. If that module should require a bus transfer, it will internally assert a MODULE REQUEST SPIGOT signal 42. The control circuit 41 will act upon that signal by moving via transition 44 to state 46. At state 46, a SPIGOT REQUEST signal 48 is asserted to the bus switch 10. The bus switch 10 then arbitrates for a communication path, as described hereinafter, and if the destination module is busy or if available paths are currently being used (i.e., a DEST SPIGOT BUSY signal 49 is returned by the bus switch), or if the destination spigot is the same as the source spigot (i.e., a LOCAL SPIGOT signal 51 is returned by the bus switch, identifying a condition that can exist when the module in question is a branch bus interface module), control will pass via transition 50 to state 52. At state 52, a SPIGOT BUSY signal 60 and the SPIGOT REQUEST signal 48 are deasserted to the bus switch, and a MODULE RELEASE signal 53 is asserted to the module hardware indicating to the module that the requested communication cannot now be established. In response to the action taken at state 52, the module will deassert the MODULE REQUEST SPIGOT signal 42, and the bus switch will deassert the DEST SPIGOT BUSY signal 49. This causes control to pass via transition 55 back to initial state 40. If, on the other hand, a communication path to the intended destination module is available, the bus switch will return a DEST SPIGOT GRANT signal 54 to the control circuit 41 causing control to pass via transition 56 to state 58. At state 58, the control circuit 41 asserts to the bus switch the SPIGOT BUSY signal 60, deasserts the SPIGOT REQUEST signal 48 and asserts to the module hardware a MODULE SPIGOT GRANT signal 62 to indicate that the requested communication link has been established. In response to the action taken at state 58, the module will deassert the MODULE REQUEST SPIGOT signal 42, causing control to pass via transition 64 back to initial state 40, where signals of control circuit 41 are reset.

If, while at state 46, the control circuit 41 should receive a SWITCH REQUEST SPIGOT signal 66 from the bus switch, control will pass via transition 68 to state 70. When this occurs, another module is arbitrating for the module in question, and, as long as the module in question has not yet completed arbitrating for its requested destination module, the arbitration cycle of the module in question is aborted. This enables that other module to quickly establish communication with the module in question. At state 70, the MODULE RELEASE signal 53 is asserted to the module hardware and the SPIGOT REQUEST signal 48 is deasserted to the bus switch. Similarly, if, while at initial state 40, the control circuit 41 simultaneously receives the SWITCH REQUEST SPIGOT signal 66 from the bus switch and the MODULE REQUEST SPIGOT signal 42 from the module hardware, the control circuit 41 will give preference to the other module arbitrating for the module in question. In such a case, control will pass via transition 72 to state 70. In response to the action taken at state 70, the module hardware will deassert the MODULE REQUEST SPIGOT signal 42, causing control to pass via transition 74 to state 76.

State 76 is reached when another module is attempting to establish communication with the module in question. State 76 can be reached as described above, or directly from initial state 40 via transition 78 when the bus switch asserts the SWITCH REQUEST SPIGOT signal 66 while the MODULE REQUEST SPIGOT signal 42 remains deasserted. At state 76, the control circuit 41 asserts a REQUEST MODULE signal 80 to the module hardware. If the module in question is not available to communicate with the other module that is requesting it, the module in question will assert a MODULE ARB FAIL signal 82 to the control circuit 41, causing control to pass via transition 84 to state 86. At state 86, the control circuit 41 will assert an ARB FAIL signal 88 to the bus switch which could then cause that other requesting module to receive a DEST SPIGOT BUSY signal. If, on the other hand, the module in question is available to communicate with that other module which is requesting to communicate with it, the hardware of the module in question will assert a MODULE GRANT signal 90 to the control circuit 41, causing control to pass via transition 92 to state 94. At state 94, the control circuit 41 will assert the SPIGOT BUSY signal 60 and an ARB PASS signal 96 to the bus switch which will then cause that other module to receive a DEST SPIGOT GRANT signal allowing it to initiate communication. In response to the action taken at either state 86 or state 94 the bus switch will deassert the SWITCH REQUEST SPIGOT signal 66 causing control to pass via transition 98 back to initial state 40.

The structure and function of the interface between a module and a bus switch via a spigot has been described in detail above. The structure and function of a bus switch, including the arbitration process carried out thereby, will be described below. As set forth above with reference to FIG. 2, the bus switch has, in addition to the crossbar switch 20, an arbiter 22 and a routing ROM 24. The arbiter 22 and the routing ROM 24 are used to implement the arbitration process, whereby potential communication paths are evaluated and one is selected, if possible, to establish a communication link between two processors.

Whenever a bus address is presented from a module 16, 18 to a spigot 14 (referred to as the "source spigot") on a bus switch 10, the bus switch 10 must decide to which spigot 14 of the bus switch 10 that bus address refers (referred to as the "destination spigot"). The illustrated bus switch 10 of the present invention allows two possible destinations to be assigned to each possible bus address. The first destination spigot (referred to as the "primary destination spigot") is used as the destination spigot if it is available to be used as a communication path. If the primary destination spigot is currently busy, the bus switch may optionally assign a second destination spigot (referred to as the "alternate destination spigot") which, if available, can be used to effect the requested communication link. It is the routing ROM 24 of a given bus switch 10 that establishes the mapping between a bus address that appears at a source spigot of that bus switch and the primary and alternate destination spigots which can be used to complete a communication path between two processors in the system.

The routing ROM 24 of the illustrated bus switch 10 can contain 4096 8-bit values, and the illustrated bus switching means of the present invention utilizes an 11-bit bus address. The primary destination spigot corresponding to a bus address received via a source spigot is determined by applying the 11-bit bus address, in inverted form, to the routing ROM 24. Thus, the lower 2048 words of the routing ROM 24 (ROM addresses 000-7FF hexadecimal) can contain mapping information for primary destination spigots corresponding to all possible 11-bit bus addresses. A description of the data stored in routing ROM addresses 000-7FF hexadecimal is given below:

TABLE 1

| Bit No. | Data Description |
|---------|------------------|
| 0 | primary destination spigot bit 0 |
| 1 | primary destination spigot bit 1 |
| 2 | primary destination spigot bit 2 |
| 3 | primary destination spigot bit 3 |
| 4 | ALT AVAIL (indicates whether an alternate destination spigot exists) |
| 5 | not used |
| 6 | not used |
| 7 | not used |

As can be seen, bits 0 through 3 specify the primary destination spigot. Bit 4 indicates the presence of an alternate destination spigot. Bits 5 through 7 are not used.

If the primary destination spigot is currently busy, the arbiter 22 will then check the alternate status bit (ALT AVAIL) to determine whether there exists an alternate destination spigot. If this bit is set, the arbiter 22 will then add 800 hexadecimal to the inverted bus address and apply that sum value to the routing ROM 24. Thus, the upper 2048 words of the routing ROM 24 (ROM addresses 800-FFF hexadecimal) can contain mapping information for alternate destination spigots corresponding to all possible 11-bit addresses. A description of the data stored in routing ROM addresses 800-FFF hexadecimal is given below:

TABLE 2

| Bit No. | Data Description |
|---------|------------------|
| 0 | alternate destination spigot bit 0 |
| 1 | alternate destination spigot bit 1 |
| 2 | alternate destination spigot bit 2 |
| 3 | alternate destination spigot bit 3 |
| 4 | not used |
| 5 | not used |
| 6 | not used |
| 7 | not used |

Figure 6:
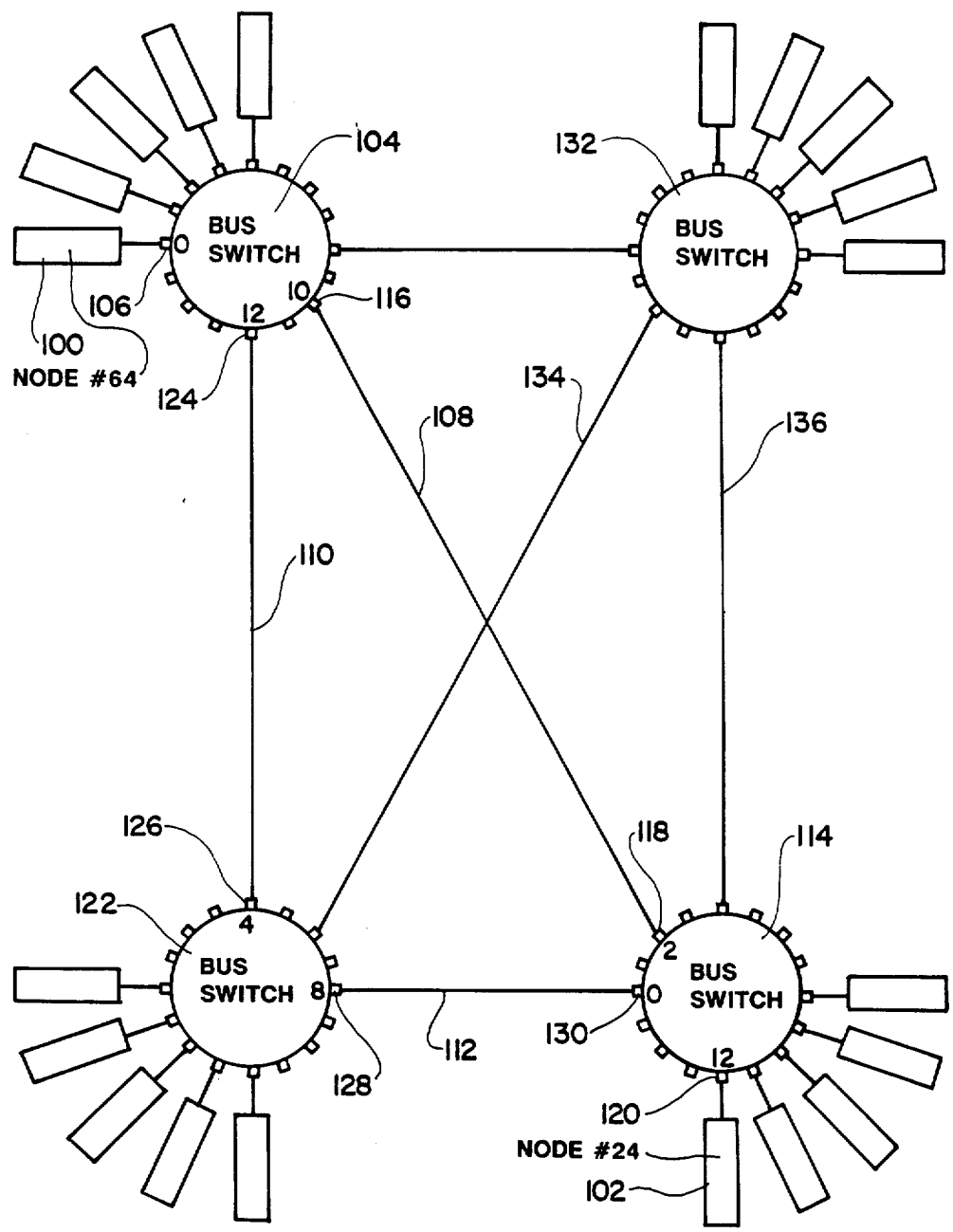
FIG. 6 is a block diagram similar to FIG. 1, but used to illustrate the function and programming of a routing ROM of a bus switch of the present invention.

An example of routing ROM programming is described below with reference to FIG. 6. FIG. 6. illustrates an exemplary system having 20 processors, four bus switches and six branch buses. For clarity, branch bus interface modules are not shown, but they would be needed at each spigot to which is connected a branch bus (as shown in FIG. 1). By way of example, processor node #64, shown at 100, may try to communicate with processor node #24, shown at 102. The routing ROM of bus switch 104 will thus be presented, via spigot 0 of bus switch 104, shown at 106, with an 11-bit bus address corresponding to the intended destination processor (processor node #24 would have an 11-bit bus address as 00000100100).

As an example, the primary communication path could be via branch bus 108, and the alternate path could be via branch buses 110 and 112. If the primary path were used it would entail participation by bus switch 104 and bus switch 114. The source spigot of bus switch 104 would be its spigot 0, shown at 106, and the destination spigot would be its spigot 10, shown at 116. Similarly, the source spigot of bus switch 114 would be its spigot 2, shown at 118, and the destination spigot would be its spigot 12, shown at 120.

If the primary path were busy and the alternate path were used, it would entail participation by bus switches 104, 122 and 114. The source spigot of bus switch 104 would be its spigot 0, shown at 106, and the destination spigot would be its spigot 12, shown at 124. The source spigot of bus switch 122 would be its spigot 4, shown at 126, and the destination spigot would be its spigot 8, shown at 128. Finally, the source spigot of bus switch 114 would be its spigot 0, shown at 130, and the destination spigot would be its spigot 12, shown at 120.

In view of the example set forth above, select words of the routing ROMs of bus switches 104, 122 and 114 can be programmed. At location 7 DB hexadecimal (corresponding to "24" hexadecimal but inverted) of the routing ROM of bus switch 104 would be programmed the data: XXX11010. The three most significant bits are represented by "X" because they do not matter as they are not used. The four least significant bits represent spigot 10, shown at 106, of bus switch 104 which, as described above, would be the primary destination spigot of bus switch 104. The remaining bit, the fourth most significant bit, is set to indicate that an alternate destination spigot exists to reach the intended destination crate (processor node #24, shown at 102). In order to identify that alternate destination spigot, location FDB hexadecimal (7 DB hexadecimal plus 800 hexadecimal) of the routing ROM of bus switch 104 would be programmed with the data: XXXX1100. The four most significant bits are not used, and the four least significant bits represent spigot 12, shown at 124, of bus switch 104 which, as described above, would be the alternate destination spigot of bus switch 104.

The routing ROM of bus switch 122 may be programmed, at location 7 DB hexadecimal, with the data: XXX01000. The four least significant bits indicate that spigot 8, shown at 128, of bus switch 122 would be the primary destination spigot for the identified conditions. Indeed, the path from spigot 8, shown at 128, of bus switch 122 to spigot 0, shown at 130, of bus switch 114 could be programmed as a primary path from bus switch 122 to any processor connected to bus switch 114. The fourth most significant bit being reset simply indicates that acceptable alternate path from bus switch 122 to bus switch 114 does not exist. As a result, the data programmed at location FDB hexadecimal of the routing ROM of bus switch 122 does not matter. It should be understood that an acceptable alternate path may be programmed, if desired, via, for example, bus switch 132 and branch buses 134 and 136.

Finally, the routing ROM of bus switch 114 would be programmed, at location 7 DB hexadecimal, with the data: XXX01100. The four least significant bits indicate that the intended destination processor is located off of spigot 12, shown at 120, of bus switch 114. Clearly, the fourth most significant "ALT AVAIL" bit would be reset because no other spigot could be used to reach processor node #24, shown at 102. Consequently, the data programmed at location FDB hexadecimal of the routing ROM of bus switch 114 does not matter.

Figure 7:
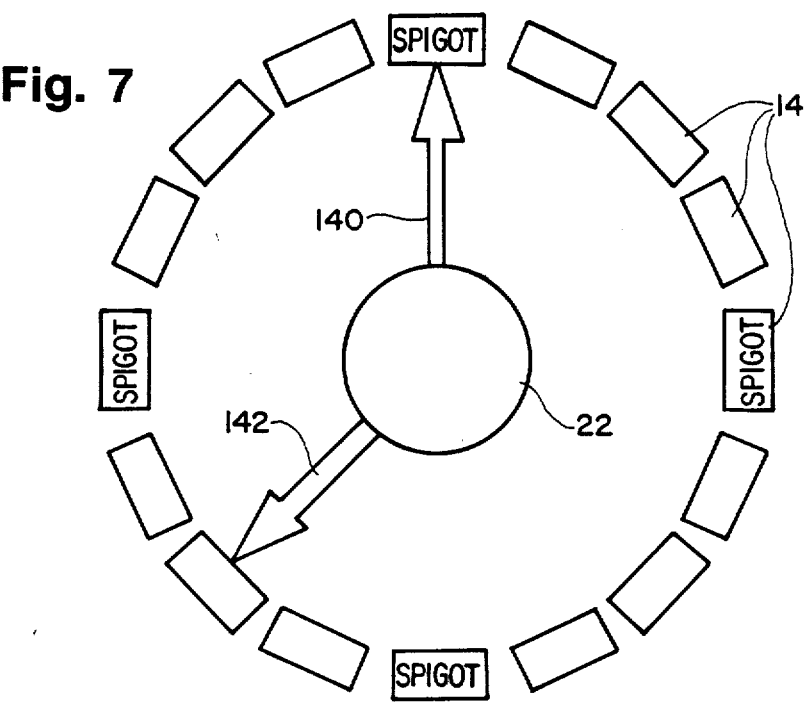
FIG. 7 conceptually illustrates pointers used by an arbiter to establish a communication path through the bus switch.

The spigot mapping function performed by the routing ROM 24 of each bus switch 10 has been described. The large communication bandwidth of the bus switching system of the present invention, however, is based upon the ability of each bus switch 10 to maintain multiple, independent simultaneous links between pairs of its spigots. The means for accomplishing this lies in the arbiter 22. The arbiter 22 is a finite state machine that detects a spigot request, controls the routing ROM 24 and arbitrates for a destination spigot specified by the routing ROM 24. The function of arbiter 22 can be understood with reference to FIGS. 7-9. The arbiter 22 of each bus switch has two pointers, a source spigot pointer 140 and a destination spigot pointer 142, each of which at all times is pointing to one of the sixteen spigots 14 of the bus switch.

The arbitration process incorporates a modified round robin scheme. When there are several pending spigot requests, the highest priority request is taken care of. Once taken care of, the spigot asserting that request becomes the lowest priority spigot, and the next highest priority request is then handled. If there are no pending requests, the source spigot pointer 140 keeps moving from one spigot to the next in a clockwise fashion in FIG. 7 until either the arbiter 22 detects a spigot request or the spigot currently being monitored by the source spigot pointer 140 or another spigot asserts a request. If any spigot asserts a request, the arbiter 22 will immediately service that request, as long as the arbiter is not in the process of servicing another request.

An indicated above, the logic of arbiter 22 implements a round robin arbitration scheme for the up to sixteen SPIGOT REQUEST signals supplied by the up to sixteen modules which can be connected to the spigots cf a bus switch. When the arbiter is ready to handle a new spigot request, it determines which request has the highest priority and then places the spigot number of the requesting module having the highest priority on the source spigot pointer lines. The round robin scheme continuously changes which input has the highest priority. When a request is serviced it becomes the lowest priority requester for the next arbitration cycle. For example, if the module at spigot 5 won the last arbitration cycle, the new priority order would be spigot numbers 6, 7, 8, 9, 10, 11, 12, 13, 14, 15, 0, 1, 2, 3, 4, 5, with spigot 6 having highest priority and spigot 5 having lowest priority.

Figure 8:
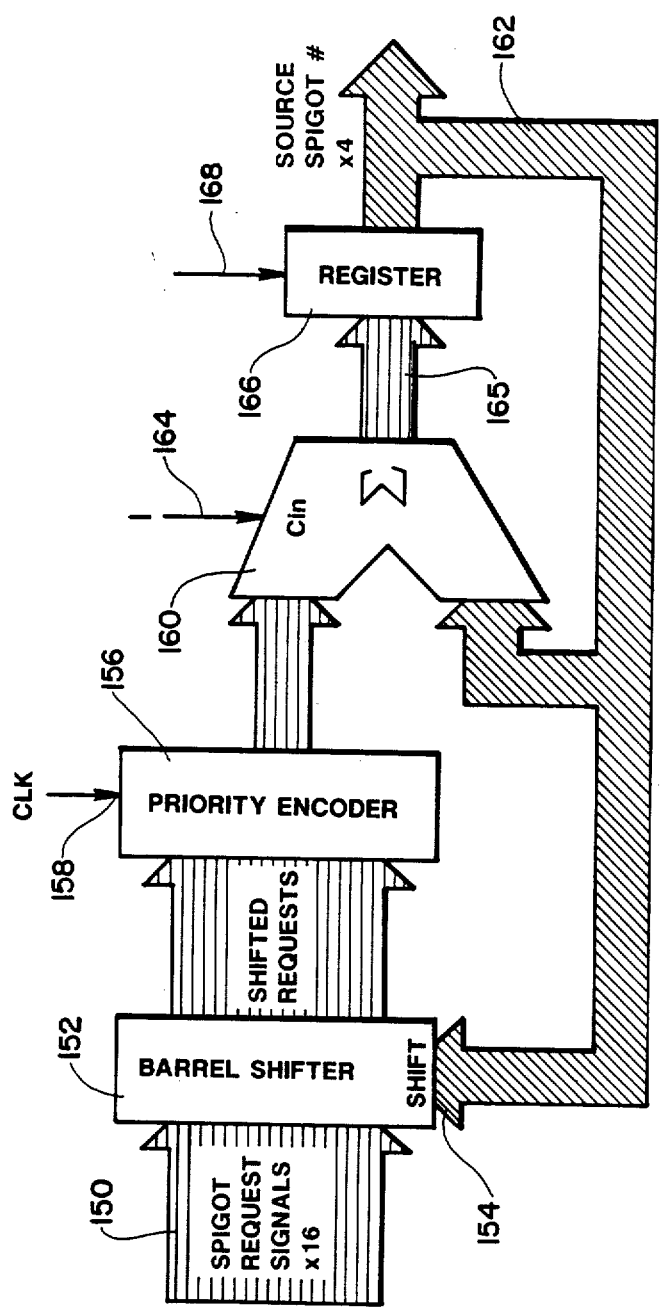
FIG. 8 is a functional block diagram illustrating the spigot arbitration function of the arbiter.

The function of the spigot arbitration logic of the arbiter may be understood with reference to FIG. 8. The SPIGOT REQUEST signals 150 from the modules at each of the sixteen spigots are input to a barrel shifter 152, but they are "pre-shifted" by one. This means that the signal from spigot 0 is connected to input 15, spigot 1 is connected to input 0, spigot 2 is connected to input 1, etc. The barrel shifter 152 is configured to execute right circular shifts depending upon the state of the shift input 154. Priority encoder 156 is a standard 16 input priority encoder, but it has a registered output. Its clock input 158 may be connected to the system clock. The output of priority encoder 156 is input to adder 160. Also input to adder 160 is the value of the current source spigot pointer 162 and the constant value "1", shown at 164. The output of adder 160, shown at 165, is the spigot number of the highest priority current spigot request. This spigot number is clocked into register 166, via a signal on line 168, when arbiter 22 is ready to handle a spigot request. At that time, the value of the output 165 of adder 160 becomes the source spigot pointer 162.

The spigot selection function of the arbiter as described above may be understood by way of the following example. First, assume that the current source spigot pointer is 0. Therefore, a SPIGOT REQUEST signal from spigot 1 would have highest priority. Now suppose a SPIGOT REQUEST signal from the module at spigot 2 is asserted. This would cause the output of priority encoder 156 to be 1. The adder 160 would add this to the current source spigot pointer 162 which is 0 and would also add the constant value 1, at 164. Thus, the output 165 of adder 160 would be 2. As soon as the arbiter is ready to handle a spigot request, the output 165 of adder 160 is clocked into register 166 where it becomes the new source spigot pointer. The new source spigot pointer would be the value "2" in the example above. Finally, the barrel shifter 152 circularly shifts all the spigot requests to the right by 2 positions, so that a SPIGOT REQUEST signal from spigot 3 would have the highest priority.

Figure 9:
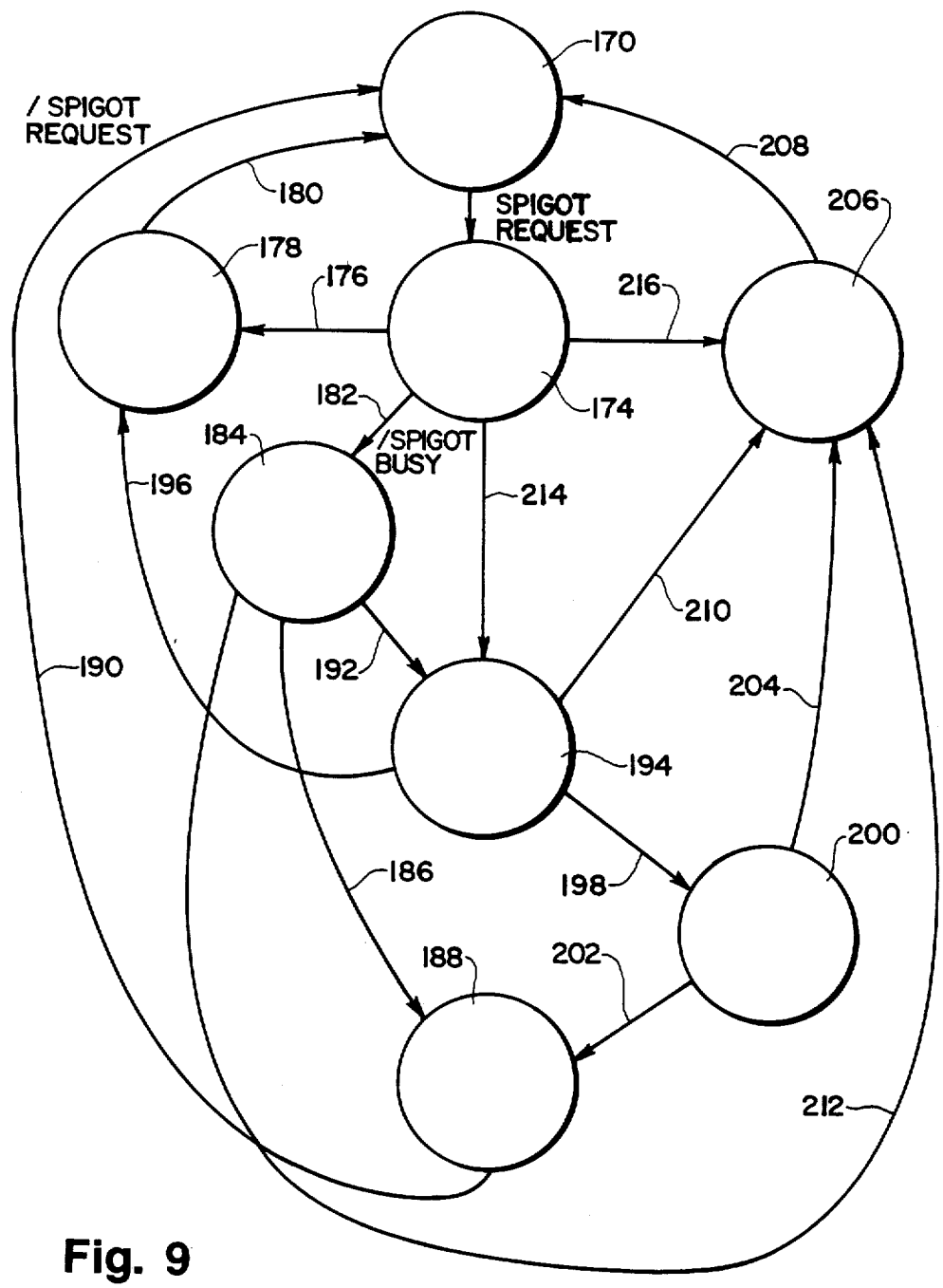
FIG. 9 is a state diagram which illustrates the method by which the arbiter arbitrates for a destination module.

Once the arbiter begins to handle a spigot request, it then must determine whether an acceptable destination spigot is available so that the crossbar switch can be reconfigured to couple the source and destination spigots and effect a communication path. FIG. 9 is a state diagram which illustrates the arbiter process of arbitrating for a destination spigot. Control remains at state 170 until a SPIGOT REQUEST signal is asserted at the spigot to which the source spigot pointer points. At that time, control passes via transition 172 to state 174. At state 174, the arbiter waits for the routing ROM to identify the primary destination spigot in response to the 11-bit destination crate address being applied thereto. If the primary destination spigot is the same as the source spigot, control passes via transition 176 to state 178. At state 178 a LOCAL SPIGOT signal is asserted to the source spigot. The action taken at state 178 causes the module at the source spigot to deassert the SPIGOT REQUEST signal, and this causes control to pass via transition 180 back to initial state 170.

If, from state 174, the primary destination spigot identified by the routing ROM is not busy (that is, if the module at that spigot is not asserting its SPIGOT BUSY signal), control passes via transition 182 to state 184. At state 184, the arbiter asserts a SWITCH REQUEST SPIGOT signal to the module at the spigot identified by the routing ROM as the primary destination spigot. If, in response to the action taken at state 184, the module at the primary destination spigot asserts an ARB PASS signal, control passes via transition 186 to state 188. At state 188, the arbiter asserts a DEST SPIGOT GRANT signal to the source spigot, indicating to the module at that spigot that a communication path exists that it can now use. In response to the action taken at state 188, the module at the source spigot deasserts its SPIGOT REQUEST signal causing control to pass via transition 190 back to initial state 170.

If, from state 184, the module at the primary destination spigot asserts an ARB FAIL signal and the ALT AVAIL bit from the routing ROM is set and a KILL ALT signal from the source spigot module is not asserted, then control passes via transition 192 to state 194. At state 194, the arbiter adds 800 hexadecimal to the bus address, as described above, and applies that value to the routing ROM so that the alternate destination spigot can be identified. If the alternate destination spigot identified by the routing ROM is the same as the source spigot, control passes via transition 196 to state 178. The action taken at state 178 is described above. If, from state 194, the alternate destination spigot module is not asserting its SPIGOT BUSY signal, control passes via transition 198 to state 200. At state 200, the arbiter asserts a SWITCH REQUEST SPIGOT signal to the module at the spigot identified by the routing ROM as the alternate destination spigot.

If, in response to the action taken at state 200, the module at the alternate destination spigot asserts an ARB PASS signal, control passes via transition 202 to state 188. The action taken at state 188 is described above. If, on the other hand, in response to the action taken at state 200, the alternate destination spigot module asserts an ARB FAIL signal, control passes via transition 204 to state 206. At state 206, the arbiter asserts a DEST SPIGOT BUSY signal to the module at the source spigot, and in response to that action, the source spigot deasserts its SPIGOT REQUEST signal, causing control to pass via transition 208 back to initial state 170. Similarly, if, from state 194, the alternate destination spigot module is asserting its SPIGOT BUSY signal, control will pass via transition 210 to state 206. The action taken at state 206 is described above. Also similarly, if, from state 184, the primary destination spigot module asserts an ARB FAIL signal and the ALT AVAIL bit is not set, or if the primary destination spigot module asserts an ARB FAIL signal and the ALT AVAIL bit is set and a KILL ALT signal from the source spigot module is asserted, control will pass via transition 212 to state 206. The action taken at state 206 is described above.

Returning to state 174 where the routing ROM is presented with a destination crate bus address and the arbiter awaits for the routing ROM to identify the primary destination spigot, if the module at the identified primary destination spigot is asserting its SPIGOT BUSY signal and the ALT AVAIL bit is set and the source spigot module is not asserting a KILL ALT signal, control will pass via transition 214 to state 194. The action to be taken at state 194 has been described above. If, in response to the action taken at state 174, none of the conditions exist that would cause control to pass via either transition 176, transition 182 or transition 214, as described above, control will then pass via transition 216 to state 206. The action that would then be taken at state 206 has been described above.

The function of the arbiter as it arbitrates for a destination spigot in response to a spigot request from a source spigot has been described in detail. The arbiter, however, also performs the function of reconfiguring the crossbar switches to implement a communication path. To enhance the operating speed of the bus switching means of the present invention, crossbar switch reconfiguration occurs simultaneously with destination spigot arbitration.

Reconfiguring a bus switch implies making a connection from one spigot through the crossbar switch to another spigot. This involves going through a configuration procedure each time a new connection is made. The preferred configuration procedure of the present invention is as follows: (1) Strobe new configuration values into an external configuration register; (2) Load the contents of the configuration register into the crossbar switch; and (3) Swap the configuration registers that are internal to the SN74AS8840 Digital Crossbar Switch integrated circuit devices. The use of the SN74AS8840 devices can be best understood with reference to the data and description documentation published by the device manufacturer.

Figure 10:
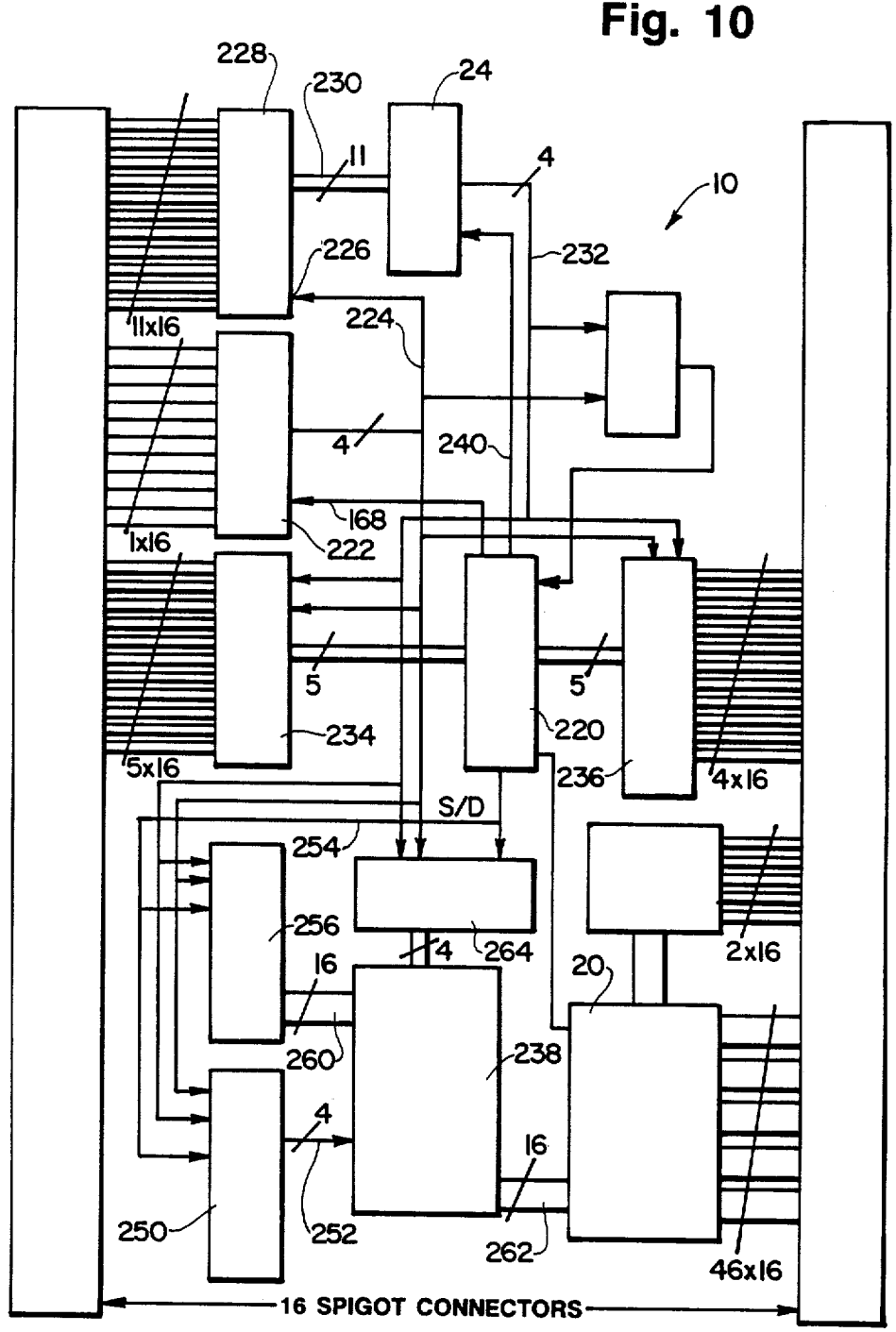
FIG. 10 is a detailed block diagram of a bus switch according to the present invention.

Having described in detail the functional elements of a bus switch of the present invention, as well as the interface capabilities of any module that would be coupled to such a bus switch, the operation of the bus switch can be understood with reference to FIG. 10, a detailed block diagram of a bus switch according to the present invention.

The bus switch circuitry performs three major functions: (1) Arbitrating between multiple requests for connections from modules trying to get through the switch; (2) Configuring the crossbar switch; and (3) Actually effecting the requested connections (the function of the crossbar switch itself). When any module requests a connection through the bus switch 10, it asserts the bus address of the ultimate intended destination module along with its SPIGOT REQUEST signal. As soon as state logic 220 has finished a previous request, it will ask for a new one. The spigot arbitration logic 222 will then identify the current highest priority request. The state logic 220 then will recognize that request and lock the source spigot pointer at that spigot.

The source spigot pointer 224 is a four bit number that represents the spigot number of the requesting module. The source spigot pointer 224 is coupled to a selection input 226 of a bus address multiplexer (mux) 228 which then selects the bus address asserted by the source spigot module. This address is applied via line 230 to the routing ROM 24 which will then output on line 232 the appropriate destination spigot pointer that will help complete the path between the source module and the destination module.

The destination spigot pointer 232, like the source spigot pointer 224, is a four bit number that represents the spigot where the destination module resides. As soon as both the source pointer 224 and the destination pointer 232 are stable, an input arbitration signal multiplexer (mux) 234 and an output arbitration signal demultiplexer (demux) 236 will route the various arbitration signals to and from the source spigot module, the state logic 220 and the destination spigot module. At that time, while awaiting propagation of the state machines of FIGS. 4 and 9, crossbar switch reconfiguration begins.

Before creating a new connection, the state logic 220 will check the destination module's SPIGOT BUSY signal to determine whether that module is available. If it is not available, the state logic 220 will either assert to the source spigot the DEST SPIGOT BUSY signal or will try to get an alternate destination spigot if one is available. Whether the ALT AVAIL bit is set determines whether an alternate exists, and whether the KILL ALT signal is asserted determines whether an alternate will be sought. If the KILL ALT signal is asserted by the source spigot module, the alternate, if any, will not be sought, and the state logic 220 will assert the DEST SPIGOT BUSY signal. If, on the other hand, the SPIGOT BUSY signal was not asserted, reconfiguration for the new connection can proceed.

Configuring crossbar switch 20 requires modifying a 64 bit external register 238, and then loading parts of it into one of two internal configuration registers in the SN74AS8840 devices which comprise the crossbar switch 20. Once one of the internal crossbar configuration registers is programmed, it is exchanged with the one that is not programmed. The newly modified internal configuration register would then be controlling the crossbar switch 20 with the other being available for modification. The state logic 220 would then make the same changes to the unmodified internal configuration register, thereby completing the reconfiguration process. The operation of the external register 238 is described in detail below.

During the configuration process, the state logic 220 arbitrates for the destination module. It does this by asserting to it a SWITCH REQUEST SPIGOT signal. The destination module will then allow itself to be used by asserting an ARB PASS signal, or not allow itself to be used by asserting an ARB FAIL signal. If the state logic 220 receives an ARB PASS signal, it will assert to the source spigot module a DEST SPIGOT GRANT signal. The source module would then be able to communicate with the destination module, and the state logic 220 would then look for another requesting module by asserting a signal on line 168, identified above with reference to FIG. 8.

If the destination module asserted an ARB FAIL signal, the result is the same as if the destination module had asserted its SPIGOT BUSY signal. The state logic 220 will either assert to the source module a DEST SPIGOT BUSY signal or try an alternate spigot, if one exists, depending upon whether a KILL ALT signal has been asserted by the source module. The routing ROM 24, as described above, contains a complete set of alternate destination spigot pointers that can be used to complete a desired path. The state logic 220 selects an alternate path, if one exists as indicated by the ALT AVIAL bit, by asserting a SELECT ALTERNATE signal on line 240. As soon as the alternate destination spigot pointer has stabilized on line 232, the module at the alternate spigot is arbitrated for, and the switch is reconfigured, as set forth above.

Figure 11:
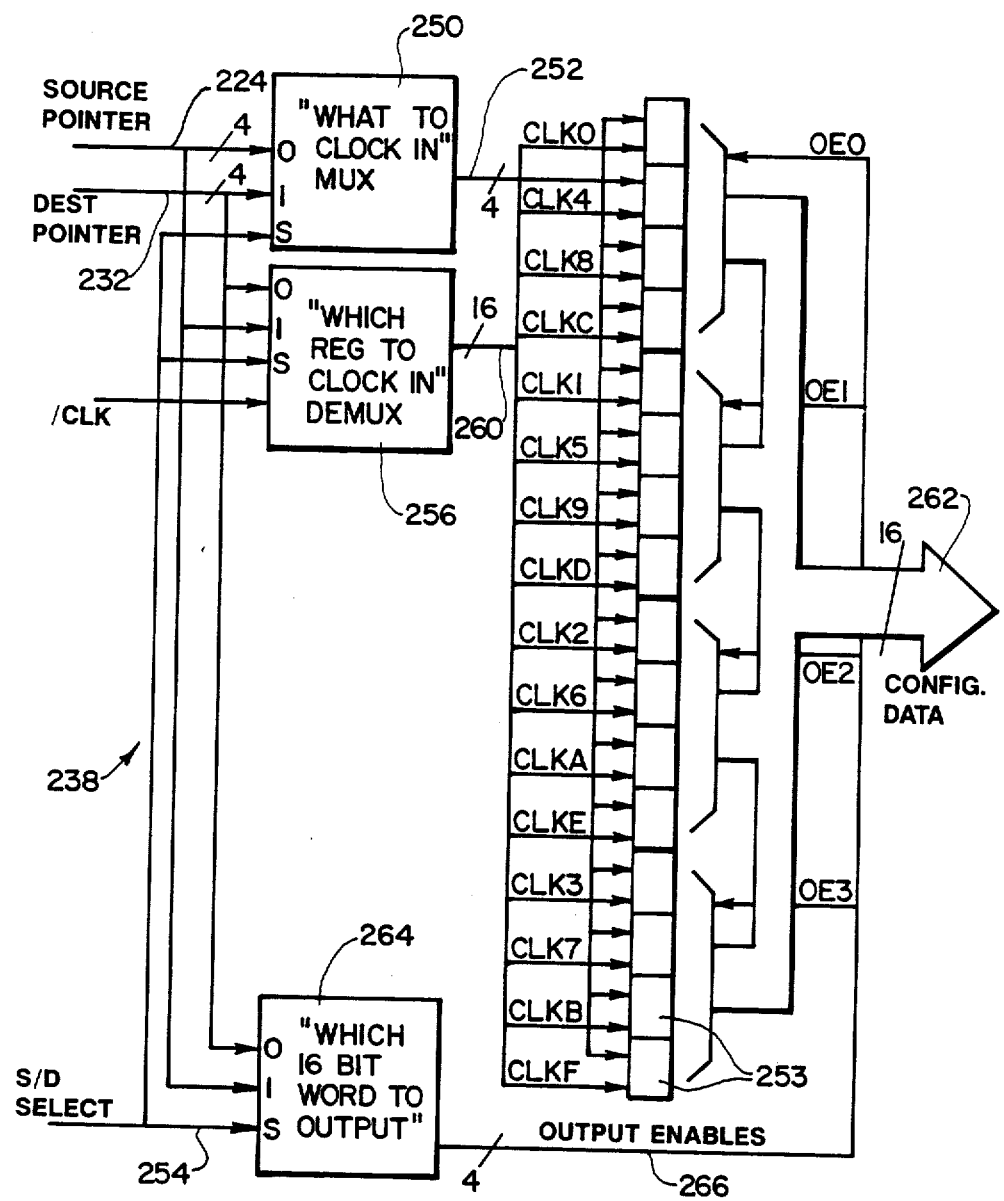
FIG. 11 is a detailed block diagram of an external configuration register used to configure a crossbar switch of a bus switch.

The crossbar switch 20 is configured using a 64-bit external configuration register 238. The register 238, shown in FIG. 11, is divided into sixteen 4-bit sections, one for each port of the devices comprising the crossbar switch 20. Each 4-bit section tells its assigned port which other port it should be listening to. The sixteen ports of a crossbar switch 20 ultimately correspond to the sixteen spigots of the bus switch 10 incorporating that crossbar switch 20. The contents of the 64-bit register 238 can be loaded into the crossbar switch 20 in 16-bit sections. The 4-bit nibbles corresponding to the sixteen ports are organized into words in the following way.

TABLE 3

| Word Address | | Configuration Register Word Contents | | | |
|---|---|---|---|---|---|
| Bit 1 | Bit 0 | Bits 15-12 | Bits 11-8 | Bits 7-4 | Bits 3-0 |
| 0 | 0 | Port 12 | Port 8 | Port 4 | Port 0 |
| 0 | 1 | Port 13 | Port 9 | Port 5 | Port 1 |
| 1 | 0 | Port 14 | Port 10 | Port 6 | Port 2 |
| 1 | 1 | Port 15 | Port 11 | Port 7 | Port 3 |

To make a new connection through bus switch 10, the source spigot pointer must be written into the 4-bit section (nibble) specified by the destination spigot pointer. Likewise, the destination spigot pointer must be written into the nibble specified by the source spigot pointer. Then, the word containing the nibble specified by the source spigot pointer must be written into the crossbar switch 20, and the word containing the nibble specified by the destination spigot pointer must also be written into the crossbar switch 20.

The 64-bit register 238 consists of 8 dual 4-bit register chips. Each chip has two separate 4-bit registers that have an output enable and a clear line. A 4-bit 2-to-1 multiplexer 250, labeled "what to clock in" is used to place either the source pointer 224 or the destination pointer 232 onto a 4-bit bus 252 that runs to the inputs of all 4-bit registers 253. An S/D SELECT signal on a line 254 is used to select which pointer appears on bus 252.

The logic used to determine which 4-bit register 253 needs to be modified consists of a 4-bit 2-to-1 multiplexer and a 1-to-16 demultiplexer. Collectively, this logic acts as a demultiplexer (demux) and is shown at 256, labeled "what reg. to clock in". The multiplexer is used to select either the source or destination pointer. Its select input is connected to the S/D SELECT signal 254. The 4-bit number from the multiplexer, along with a system clock signal, /CLK, on line 258, is received by the demultiplexer which places a low-going pulse, synchronous with the /CLK signal 258, on one of sixteen clock lines, shown at 260, going to the 4-bit registers 253. Which one of the 16 clock lines 260 is determined by the 4-bit number representing either the source or destination pointer. When the /CLK signal 258 goes low, the selected clock line 260 will also go low causing the pointer value on bus 252 to be clocked into the 4-bit register 253 selected by demultiplexer 256. The sixteen clock lines 260 are labeled "CLK0" through "CLKF".

It should be noted that the source pointer 224 is connected to input 0 of multiplexer 250 and input 1 of demultiplexer 256, while the destination pointer 232 is connected to the other inputs. In this way, while the source pointer 224 is being used to specify which 4-bit register 253 to clock, the destination pointer 232 is clocked in, and vice versa.

A single programmable array logic device (PAL) is used to determine which 16-bit section is loaded via bus 262 into the crossbar switch 20. The PAL is shown at 264 and is labeled "which 16 bit word to output". The PAL 264 looks at the lower two bits of the source and destination pointers 224, 232 and the S/D SELECT line 254 to determine which 16-bit word to output. The function of PAL 264 is described as follows:

TABLE 4

| S/D SELECT | Source Bit 1 | Source Bit 0 | Destination Bit 1 | Destination Bit 0 | Word to Output |
|---|---|---|---|---|---|
| 0 | X | X | 0 | 0 | 0 |
| 0 | X | X | 0 | 1 | 1 |
| 0 | X | X | 1 | 0 | 2 |
| 0 | X | X | 1 | 1 | 3 |
| 1 | 0 | 0 | X | X | 0 |
| 1 | 0 | 1 | X | X | 1 |
| 1 | 1 | 0 | X | X | 2 |
| 1 | 1 | 1 | X | X | 3 |

The selected 16-bit word to be output via bus 262 is identified by one of four OUTPUT ENABLE signals 266 (OE0 through OE3). The particular 4-bit registers 253 that will form the selected 16-bit word are shown in Table 3.

The foregoing description of the invention has been presented for purposes of illustration and description. It is not intended to limit the invention to the precise forms disclosed, and obviously many modifications and variations are possible in light of the above teachings.

What is claimed is:

1. In a computer system having multiple processors with each of the processors linked to a bus switch and also having a branch bus linking at least two bus switches, means for effecting multiple simultaneous communication links between processors comprising:
    means for generating a request for a communication path from a first processor to a second processor, said request received by a first bus switch via a first source spigot and accompanied by a bus address of said second processor;
    means associated with said first bus switch for detecting said request and for identifying a first primary destination spigot of said first bus switch that if linked to said first source spigot could form part of said communication path;
    means for determining whether said first primary destination spigot is available to be linked to said first source spigot;
    means for indicating whether a first alternate destination spigot exists that if linked to said first source spigot could form part of said communication path in the event that said first primary destination spigot is busy;
    means for determining whether said first alternate destination spigot is available to be linked to said first source spigot;
    means for effecting a communication link between said first source spigot and a first selected one of said first destination spigots to form a part of said communication path through said first bus switch, thereby completing said communication path if said second processor is connected to said first selected destination spigot;
    means for communicating said request and said bus address of said second processor to a second bus switch via a branch bus linking said first and second bus switches which could form a part of said communication path, said request and bus address received by said second bus switch via a second source spigot;
    means associated with said second bus switch for detecting said request and for identifying a second primary destination spigot of said second bus switch that if linked to said second source spigot could form part of said communication path;
    means for determining whether said second primary destination spigot is available to be linked to said second source spigot;
    means for determining whether said second alternate destination spigot is available to be linked to said second source spigot; and
    means for effecting a communication link between said second source spigot and a second selected one of said second destination spigots to form a part of said communication path through said second bus switch, thereby completing said communication path if said second processor is connected to said second selected destination spigot.

2. A method for effecting multiple simultaneous communication links between processors in a computer system having multiple processors with each of the processors linked to a bus switch and also having a branch bus linking at least two bus switches comprising the steps of:
    generating a request for a communication path from a first processor to a second processor, said request received by a first bus switch via a first source spigot and accompanied by a bus address of said second processor;
    detecting said request and identifying a first primary destination spigot of said first bus switch that if linked to said first source spigot could form part of said communication path;
    determining whether said first primary destination spigot is available to be linked to said first source spigot;

indicating whether a first alternate destination spigot exists that if linked to said first source spigot could form part of said communication path in the event that said first primary destination spigot is busy;

effecting a communication link between said first source spigot and a first selected one of said first destination spigots to form a part of said communication path through said first bus switch, thereby completing said communication path if said second processor is connected to said first selected destination spigot;

communicating said request and said bus address of said second processor to a second bus switch via a branch bus linking said first and second bus switches which could form a part of said communication path, said request and bus address received by said second bus switch via a second source spigot;

detecting said request and identifying a second primary destination spigot of said second bus switch that if linked to said second source spigot could form part of said communication path;

determining whether said second primary destination spigot is available to be linked to said second source spigot;

indicating whether a second alternate destination spigot exists that if linked to said second source spigot could form part of said communication path in the event that said second primary destination spigot is busy;

determining whether said second alternate destination spigot is available to be linked to said second source spigot; and effecting a communication link between said second source spigot and a second selected one of said second destination spigots to form a part of said communication path through said second bus switch, thereby completing said communication path if said second processor is connected to said second selected destination spigot.

* * * * *